(12) United States Patent
Sivasubramanian et al.

(10) Patent No.: US 10,608,953 B2
(45) Date of Patent: Mar. 31, 2020

(54) PLATFORM WITH MULTIPLE EXECUTION ENGINES

(71) Applicant: General Electric Company, Schenectady, NY (US)

(72) Inventors: Venkatesh Sivasubramanian, San Ramon, CA (US); Sriramakrishna Yelisetti, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 15/856,672

(22) Filed: Dec. 28, 2017

(65) Prior Publication Data

US 2019/0207867 A1 Jul. 4, 2019

(51) Int. Cl.
*H04L 12/911* (2013.01)
*G06F 9/54* (2006.01)

(52) U.S. Cl.
CPC .............. *H04L 47/781* (2013.01); *G06F 9/54* (2013.01); *G06F 9/541* (2013.01)

(58) Field of Classification Search
None
See application file for complete search history.

(56) References Cited

U.S. PATENT DOCUMENTS

| | | | |
|---|---|---|---|
| 2012/0266156 A1* | 10/2012 | Spivak | G06F 9/5055 717/172 |
| 2013/0138810 A1* | 5/2013 | Binyamin | H04L 41/50 709/225 |
| 2014/0032651 A1* | 1/2014 | Singh | H04L 67/10 709/203 |
| 2014/0075565 A1* | 3/2014 | Srinivasan | G06Q 10/06315 726/26 |
| 2014/0130038 A1* | 5/2014 | Lucovsky | G06F 9/45533 717/176 |
| 2014/0201724 A1* | 7/2014 | Nelson | G06F 8/38 717/138 |
| 2015/0150137 A1* | 5/2015 | Bettini | G06F 21/57 726/25 |
| 2015/0379259 A1* | 12/2015 | Mohammed | G06F 21/45 726/6 |
| 2016/0277231 A1* | 9/2016 | Sripathan | H04L 41/0883 |

* cited by examiner

*Primary Examiner* — Nicholas R Taylor
*Assistant Examiner* — Tania M Pena-Santana
(74) *Attorney, Agent, or Firm* — Buckey, Maschoff & Talwalkar LLC (57) ABSTRACT

The example embodiments are directed to a system and method for deploying and monitoring applications within a cloud environment including multiple execution engines. In one example, the system includes a network interface configured to receive an application from a client, and a processor configured to determine a cloud services platform, from among a plurality of different cloud services platforms, to be a host platform for the application, and retrieve API information from storage that is unique to the determined cloud services platform and which is to be used for communicating with the determined cloud services platform when executing the application, wherein the processor is further configured to launch an execution of the application via the determined cloud services platform and communicate with the determined cloud services platform on behalf of the executing application based on the retrieved API information.

18 Claims, 8 Drawing Sheets

PLATFORM WITH MULTIPLE EXECUTION ENGINES

BACKGROUND

Machine and equipment assets are engineered to perform particular tasks as part of a process. For example, assets can include, among other things and without limitation, industrial manufacturing equipment on a production line, drilling equipment for use in mining operations, wind turbines that generate electricity on a wind farm, transportation vehicles, gas and oil refining equipment, and the like. As another example, assets may include devices that aid in diagnosing patients such as imaging devices (e.g., X-ray or MRI systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies, have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software. In particular, analytic applications have grown and become useful for analyzing raw or filtered data from an asset and analyzing the data to provide some form of understanding of the data to a user.

When a developer designs an analytic application, the developer must spend a significant amount of time ensuring that the analytic application is compatible with an underlying host platform (also referred to as an execution engine) where the application will be executed. One such type of host platform is a cloud services platform. Examples of a cloud services platform include, but are not limited to, AMAZON WEB SERVICES® (AWS®), GOOGLE CLOUD®, MICROSOFT AZURE®, IBM CLOUD®, and the like. However, each cloud services platform interacts and communicates with applications differently. In addition, each cloud services platform may have different services, different functionality, different content delivery, different data storage, different communications, different security, and/or the like.

Therefore, it is very difficult for a developer to design a single version of a software application that is compatible with more than one type of cloud services platform. Instead, the developer typically develops different versions of the application for different cloud services platform. Learning how to design an application that will be compatible with a previously unknown cloud services platform can take a developer a significant amount of time (e.g., weeks and even months) because the developer must learn the intricacies of the functionality required for the cloud services platform. Furthermore, multiple runtime environments may be incorporated within a cloud services platform and each runtime environment may include unique classes and functions that can be used to process input, manage hardware devices, and interact with system software.

SUMMARY

The example embodiments improve upon the prior art by providing a software program and a system that creates a layer of abstraction between an application and a host cloud services platform such that a developer does not need to incorporate cloud services specific communication protocols and other attributes within the application. Rather, a developer can simply submit an application without knowing the details of the underlying cloud services platform where the application will be executed. Rather, the software can determine a cloud services platform where the application is to be deployed and interact with the cloud services platform on behalf of the application in order to perform necessary communications between the cloud services platform and the application while the application is executing. In addition, the example embodiments also provide a unified monitoring interface capable of monitoring performance of applications in different runtime environments via a single modified interface.

According to an aspect of an example embodiment, a computing system includes one or more of a network interface configured to receive an application from a client, and a processor configured to determine a cloud services platform, from among a plurality of different cloud services platforms, to be a host platform for the application, and retrieve application programming interface (API) information from storage that is unique to the determined cloud services platform and which is to be used for communicating with the determined cloud services platform when executing the application, wherein the processor is further configured to launch an execution of the application via the determined cloud services platform and communicate with the determined cloud services platform on behalf of the executing application based on the retrieved API information.

According to an aspect of another example embodiment, a method includes one or more of receiving an application from a client, determining a cloud services platform, from among a plurality of different cloud services platforms, to be a host platform for the application, retrieving application programming interface (API) information from storage that is unique to the determined cloud services platform and which is to be used for communicating with the determined cloud services platform when executing the application, and launching the application via the determined cloud services platform while communicating with the determined cloud services platform on behalf of the executing application based on the retrieved API information.

According to an aspect of another example embodiment, a computing system includes one or more of a processor configured to receive application performance data of an application from a runtime environment, the application performance data including performance attributes of the application that are captured while executing the application in the runtime environment, and modify the application performance data into runtime environment agnostic application performance data, and an output configured to output the runtime environment agnostic application performance data for display via a unified monitoring interface that is configured to display application performance data of different runtime environments.

According to an aspect of another example embodiment, a method includes one or more of receiving application performance data of an application from a runtime environment, the application performance data including performance attributes of the application captured while executing the application in the runtime environment, modifying the application performance data into runtime environment agnostic application performance data, and outputting the runtime environment agnostic application performance data for display via a unified monitoring interface that is configured to display application performance data of different runtime environments.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a service and a system which can facilitate deployment and monitoring of a software application (e.g., an industrial analytic application) via an underlying cloud services platform. The system may include or may have access to multiple different cloud services providers/platforms due to client needs, pre-existing data storage, client preferences, and the like. Furthermore, within each cloud services platform may exist multiple different runtime environments which can be used to run/process the application for execution on the cloud services platform. According to various aspects, a developer may submit their application to the system described herein. The submitted application may be cloud services platform agnostic in that it does not include platform-specific information therein such as communication information (e.g., APIs), security information, log data information, and the like, pre-coded therein for a particular cloud services platform. Instead, the service herein may determine a cloud services platform for hosting the application and automatically communicate with the host cloud services platform to meet the requirements of the cloud services platform. As a result, a developer does not need to spend time coding various requirements of a cloud services platform because the service performs the job on behalf of the developer.

According to various embodiments, after the application has been launched and is executing on a cloud services platform, the service herein may provide a unified monitoring interface that can receive application performance data from different runtime environments and output/display the application performance information via a common and unified user interface. In conventional monitoring approaches, each distinct runtime environment has its own interface for performance monitoring. In particular, each distinct runtime environment provides for different predefined classes and functions that can be used to process input, manage hardware devices of the host platform, and interact with system software of the host platform. Furthermore, each runtime environment typically provide its own communication interface for querying and receiving performance data of an application. Therefore, if an application is executed in different frameworks, the application must include different code for monitoring the application within the different frameworks. In contrast, the service described herein provides a layer of abstraction between different runtime environments (e.g., APIs, data logs, etc.), modifies performance data received from the runtime environments, and outputs the performance data via a single user interface design that can be used for applications in different runtime environments.

The system and the software described herein may be incorporated within or otherwise used in conjunction with applications for managing machine and equipment assets and can be hosted within an Industrial Internet of Things (IIoT). For example, an IIoT may connect assets, such as turbines, jet engines, locomotives, elevators, healthcare devices, mining equipment, oil and gas refineries, and the like, to the Internet, the cloud, and/or to each other in some meaningful way such as through one or more networks. The service described herein can be implemented within a "cloud" or remote or distributed computing resource. The cloud can be used to receive, relay, transmit, store, analyze, or otherwise process information for or about assets and manufacturing sites. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

Integration of machine and equipment assets with the remote computing resources to enable the IIoT often presents technical challenges that are separate and distinct from the specific industry and from computer networks, generally. An asset may need to be configured with novel interfaces and communication protocols to send and receive data to and from distributed computing resources. Also, assets may have strict requirements for cost, weight, security, performance, signal interference, and the like. As a result, enabling such an integration is rarely as simple as combining the asset with a general-purpose computing system.

The PredixZ™ platform available from GE is a novel embodiment of such an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial and/or healthcare based assets can be uniquely situated to leverage its understanding of assets themselves, models of such assets, and industrial operations or applications of such assets, to create new value for industrial customers through asset insights.

Figure 1:
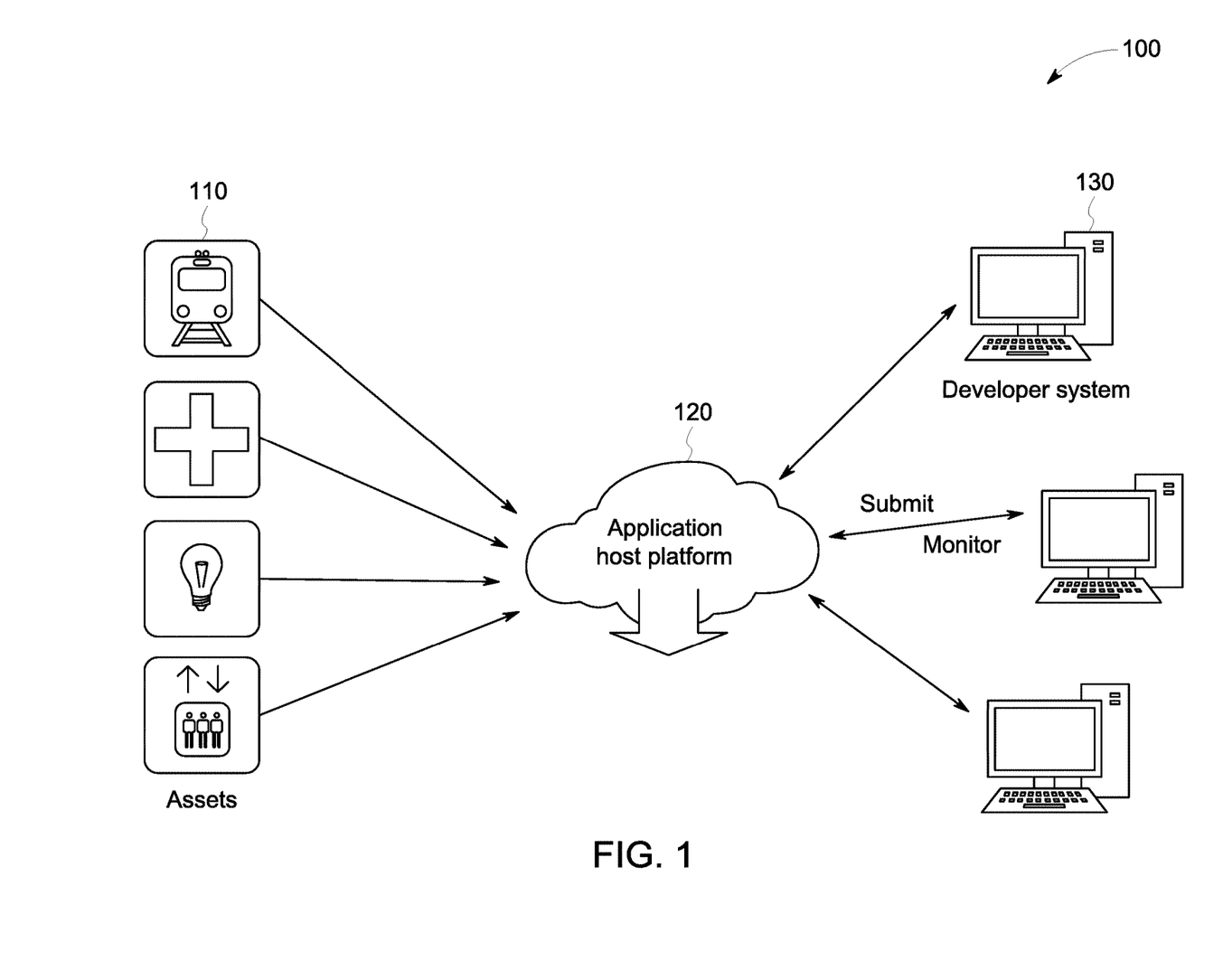
FIG. 1 is a diagram illustrating a cloud computing environment in accordance with an example embodiment.

FIG. 1 illustrates a cloud computing environment 100 for deploying and monitoring a software application in accordance with an example embodiment. Referring to FIG. 1, the cloud computing environment 100 includes a plurality of assets 110 which may be included within an IIoT and which may transmit/publish raw data (e.g., sensor data, etc.) to a source storage location such as the host platform 120 which may be a distributed cloud computing platform including databases, stream processors, servers, and the like. The data stored at the host platform 120 or passing through the host platform 120 may be processed using one or more applications published or otherwise provide by developers 130. The assets 110 herein may include machine or equipment used in industry, manufacturing, healthcare, transportation, energy, or the like. Also, although not shown in FIG. 1, the assets 110 may be coupled to or otherwise connected to computing systems such as industrial computers, asset control systems, intervening industrial servers, and the like, which are coupled to or in communication with an asset.

In the example of FIG. 1, an asset management platform (AMP) can reside in or otherwise be connected to cloud computing platform 120 and may be included in a local or sandboxed environment, or can be distributed across multiple locations or devices and can be used to interact with the assets 110 which may publish sensor data and other raw and filtered data to the system. The AMP can be configured to perform functions such as data acquisition, data analysis, data exchange, and the like, with local or remote assets, or with other task-specific processing devices. For example, the assets 110 may be an asset community (e.g., turbines, healthcare, power, industrial, manufacturing, mining, oil and gas, elevator, etc.) which may be communicatively coupled to the host platform 120.

In an example, external sensors can be used to sense information about a function of an asset 110, or to sense information about an environment condition at or near an asset, a worker, a downtime, a machine or equipment maintenance, and the like. The external sensor can be configured for data communication with the host platform (e.g., a stream processing storage, a database, a server, etc.) which can be configured to store the raw sensor information and transfer the raw sensor information over a network to a central location in the cloud platform where it can be accessed by developers 130 (e.g., users, applications, systems, subscribers, and the like) for further processing. Furthermore, an operation of the assets may be enhanced or otherwise controlled by a user inputting commands though an application hosted by the cloud computing platform 120 or other remote host platform such as a web server or system coupled to the cloud platform 120.

Developers 130 may refer to developer systems which can be used to design software which can be launched on the host platform 120 and made available to users. The developers 130 may build an application in any desired programming language and make it compatible with any desired runtime environment, framework, etc. for executing the application. In addition, the host platform 120 can also include services that developers can use to build or test industrial or manufacturing-based applications and services to implement IIoT applications that interact with output data from the assets 110. For example, the host platform 120 may host a microservices marketplace where developers can publish their distinct services and/or retrieve services from third parties. In addition, the cloud platform 120 can host a multi-development framework for communicating with various available services or modules. The development framework can offer developers a variety of different frameworks which can be used by applications deployed on the host platform 120 to improve user experience in web or mobile applications. Developers can add and make accessible their applications (services, data, analytics, etc.) via the cloud platform 120. Analytics are capable of analyzing data from or about a manufacturing process and provide insight, predictions, and early warning fault detection.

According to various aspects, the host platform 120 may have access to or otherwise be coupled to multiple different cloud services platforms. As a non-limiting example, cloud services platforms include AMAZON WEB SERVICES® (AWS®), GOOGLE CLOUD®, MICROSOFT AZURE®, IBM CLOUD®, and the like. Within each cloud services platform may be one or more frameworks/runtime environments that are capable of running a software application and communicating with the underlying platform. Non-limiting examples of frameworks and/or runtime environments include APACHE SPARK®, TENSORFLOW®, APACHE FLINK®, APACHE HADOOP® (e.g., HADOOP YARN®, etc.), APACHE MESOS®, and the like. Terms like framework and runtime environment should be understood herein to refer to similar if not the same concepts. Frameworks are often overlapped with runtime environments, and vice versa. Furthermore, a framework executing within a first cloud services provider such as APACHE SPARK® on AWS® can have different functions, classes, and/or requirements than the framework executing within a second cloud services provider such as APACHE SPARK® on MICROSOFT AZURE®.

Figure 2:
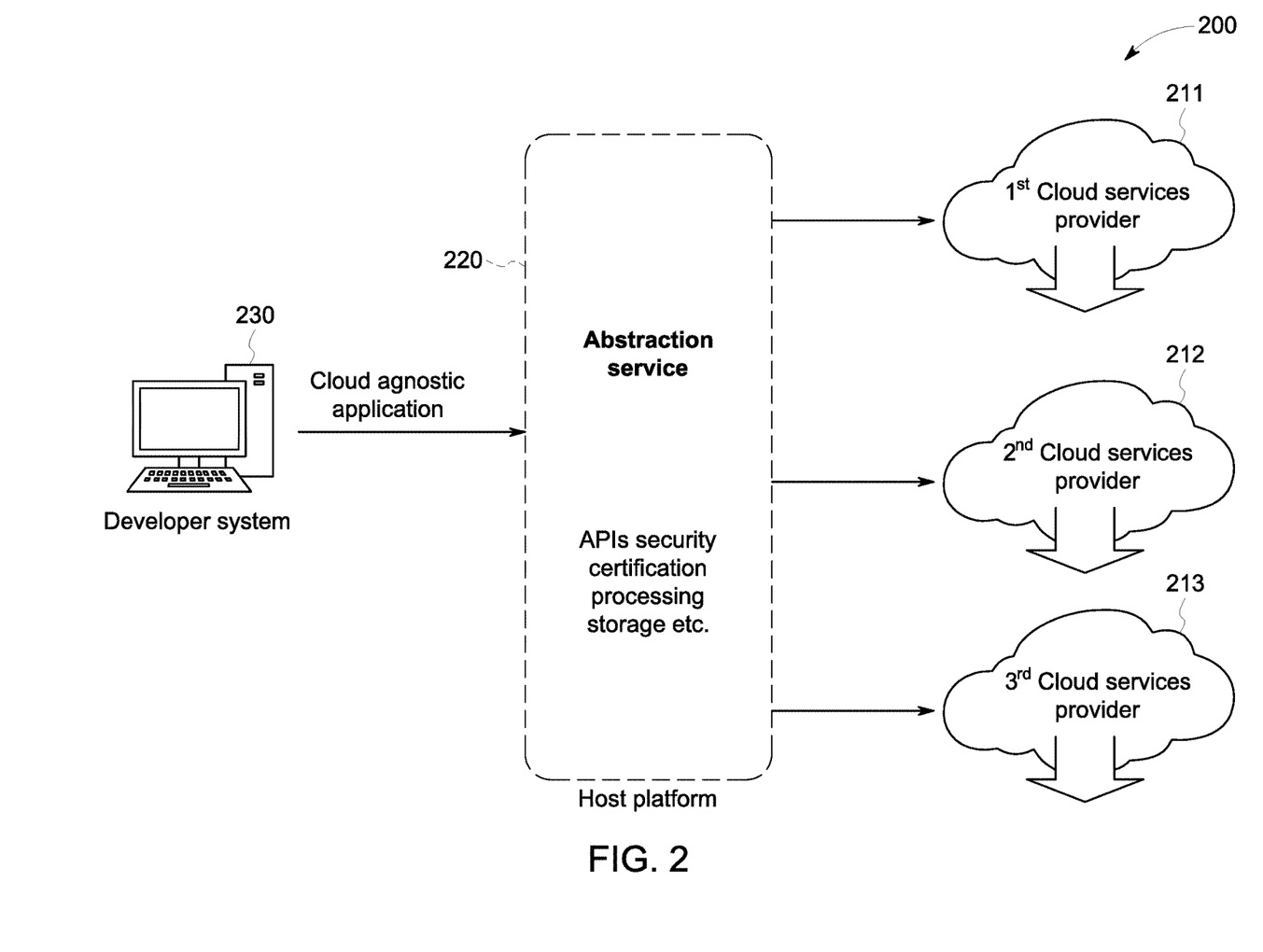
FIG. 2 is a diagram illustrating a service managing an environment including multiple execution engines in accordance with an example embodiment.

FIG. 2 illustrates a service 220 for managing a host environment including multiple execution engines in accordance with an example embodiment. As described herein, an execution engine may refer to a platform and the hardware/software components which are used to execute an application. Examples of execution engines include cloud computing platforms capable of hosting applications for access via users of the Internet. Cloud computing relies on sharing of resources to achieve coherence and scale. Cloud computing often uses a virtual cluster of computers available at all times through the Internet. The clustering mechanisms performed by each cloud platform may be different.

Referring to the example of FIG. 2, a plurality of cloud services platforms 211, 212, and 213, are capable of hosting an application provided by developer system 230. In this example, the developer system 230 may provide the application to an intermediate abstraction service 220 which manages distribution to cloud services providers 211, 212, and 213. Each cloud services platform 211, 212, and 213 may include unique attributes with respect to one another such as data access/communication methods (e.g., APIs). Also, each cloud services platform may have its own unique security protocol, certifications, processing mechanisms, services within, storage procedures, and the like.

Ordinarily a developer would need to know the cloud services platform where the application will be deployed because these attributes would need to be implemented within the code of the software application. However, the abstraction service 220 according to various embodiments is capable of dynamically implementing these attributes on behalf of the application based on a cloud services platform 211, 212, and 213 where the application will be deployed. As a result, the application provided by the developer system 230 may be cloud services agnostic. For example, the application may be an executable file but may not include code for accessing APIs of the cloud services platform. Rather, the abstraction service 220 can implement these for the application. Accordingly, it is not necessary for a developer to know where the application will be deployed thereby creating significantly greater flexibility for the host platform which includes the abstraction service 220. There are also benefits to the client by providing different cloud services platforms. For example, the client may have their pre-existing data already stored by one of the cloud services providers resulting in greater efficiency.

According to various aspects, the abstraction service 220 may receive an executable analytic application file uploaded from the developer 230 and dynamically determine or otherwise select a cloud services platform from among the different cloud services platforms 211, 212, and 213, where the application is to be deployed. In some cases, the cloud services platform may be selected by the developer 230 or it may be automatically selected by the abstraction service 220. As a result, the developer 230 does not need to generate code for different cloud services platforms and different frameworks. In fact, the developer 230 does not need to be aware of the platform/runtime framework where the application will be executed because the service 220 can handle the deployment of the application behind the scenes. As a result, a developer 230 can simply build a model/analytic with a specific business function without being concerned with the executing platform and framework in which the analytic will be executed. In some embodiments, the abstraction service 220 may include a group of representational state transfer (RESTful) API endpoints capable of interacting with respective APIs of the cloud services platforms and frameworks therein for handling the transfer of data between the application and the cloud services platforms.

According to various embodiments, the abstraction service 220 may provide a layer of abstraction between the analytic application and the platform and framework in which the application is being executed. Due to the layer of abstraction, a developer does not need to know the platform in which their analytic will be executed because the service 220 takes care of it on behalf of the user in an automated and smart fashion. As a result, developers may experience a significant reduction in the amount of time spent building the analytic application because the application is agnostic with respect to the execution environment. In addition, the service 220 is a smart service because it can determine the best platform/framework where to deploy the application based on a job task to be performed by the application. Developers may build analytics for different platforms however the developer may be unaware that a better platform/framework exists for their particular use case. The service herein can automatically determine the best platform and framework within the platform based on the job being performed by the analytic. Furthermore, if a new cloud services platform or framework is made available, the service 220 can be expanded to include the newly derived platform/framework thereby extending the deployment/execution capabilities of an analytic application without requiring the developer to make any changes to the existing code of the application.

Figure 3:
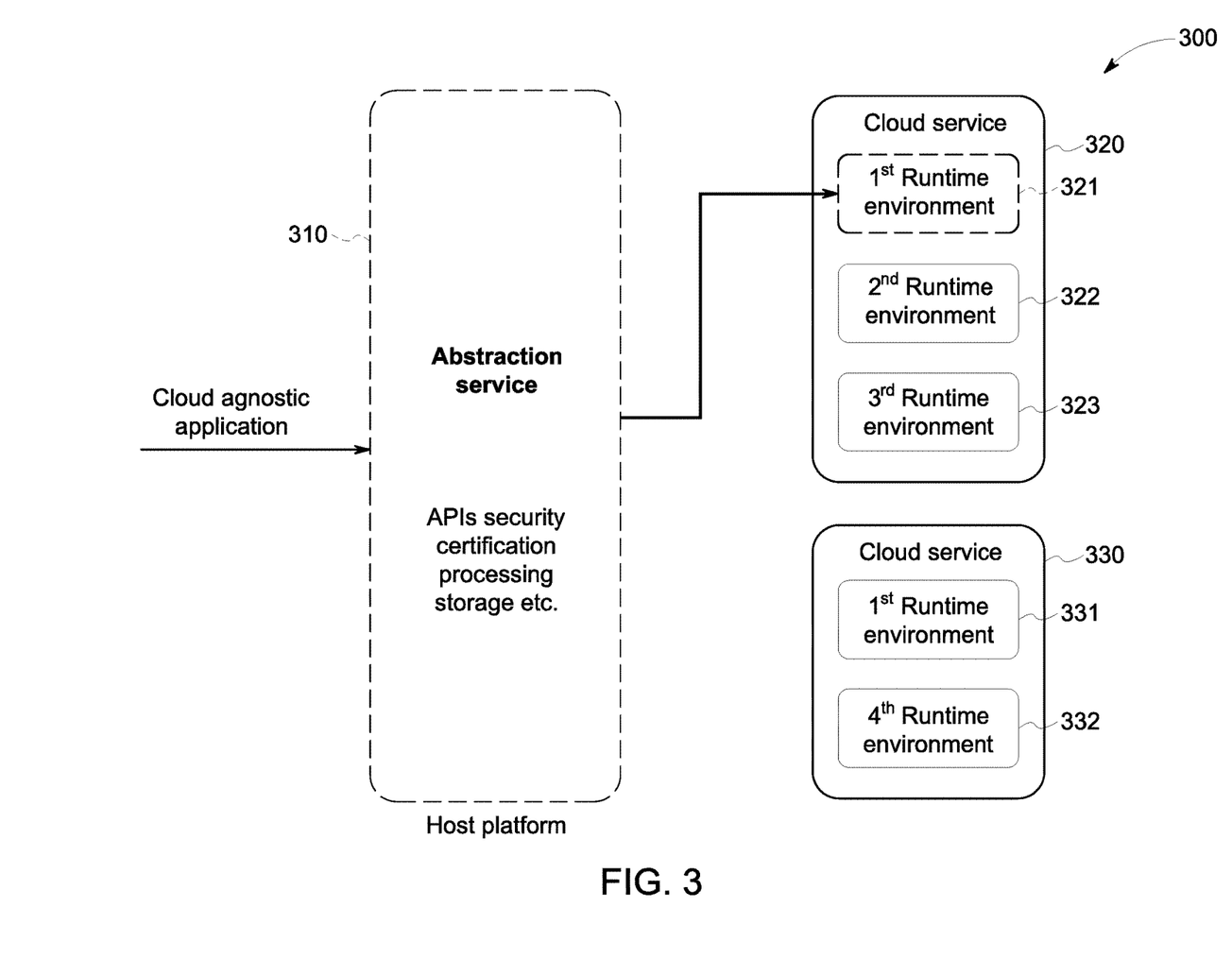
FIG. 3 is a diagram illustrating a service managing an environment including multiple execution engines in accordance with another example embodiment.

FIG. 3 illustrates a service 310 managing an environment including multiple execution engines in accordance with another example embodiment. Similar to the example of FIG. 2, multiple cloud service providers 320 and 330 can host an application provided from a developer system (not shown). In this example, the abstraction service 320 determines the cloud services provider 320 as a host for the application. However, in this example, the abstraction service 310 further drills down into the cloud services platform 320 and determines a runtime environment/framework 321 where the application is to be deployed from among a plurality of different runtime environments 321, 322, and 323.

That is, within each cloud services platform may exist multiple different runtime environments/frameworks capable of executing the application. In some cases, more than one runtime environment can be used to execute the application, however one runtime environment may be better or more optimal based on a type of job/task to be performed. In this example, the job task can be extracted by the service 310 from metadata of the analytic application (e.g., TAR file) and used by the service 310 to determine where to deploy and execute the analytic application based on a framework/runtime environment that is best suited for the use case of the analytic application. The cloud services platforms may share the same runtime environments. Also, the cloud services platforms may have different runtime environments with respect to each other.

In this example, the abstraction service 310 may further handle specific processing/execution attributes of the selected runtime environment 321 on behalf of the application. For example, the abstraction service 310 may handle API access, security, certifications, processing, storage, and the like, which are unique to the selected runtime environment 321 from among the different runtime environments 321, 322, and 323. Accordingly, the developer does not need to know a cloud services platform or a runtime environment where the application will be deployed because the service 310 can take care of the communications, data, security, etc. on behalf of the application.

Once an application has been deployed and is executing on a host platform, according to various embodiments, the application may be tracked and monitored to determine how the application is performing within the host environment. Application performance monitoring and management can be used to monitor and manage performance of code, application dependencies, transaction times, throughput, user experience, and the like. The monitored data can be output in a user friendly interface which can include application metrics, code lever performance, network based statistics, and the like, which can be output and visualized in a user friendly manner. In some cases, the application performance management can identify problems and also suggest solutions or provide reasons why the problems are occurring by identifying exactly which component or process is affected.

However, typically, each runtime environment has its own application performance monitoring methods and visualizations for view application performance which requires a developer to generate and implement specific code within their application for monitoring performance based on the environment in which the code will be operating. In contrast, the example embodiments provide a service that can provide a layer of abstraction between different runtime environments and a common monitoring interface, by communicating with the runtime environments, acquiring the performance data, and outputting the performance data via a unified monitoring interface that can be used for all runtime environments/frameworks.

Figure 4:
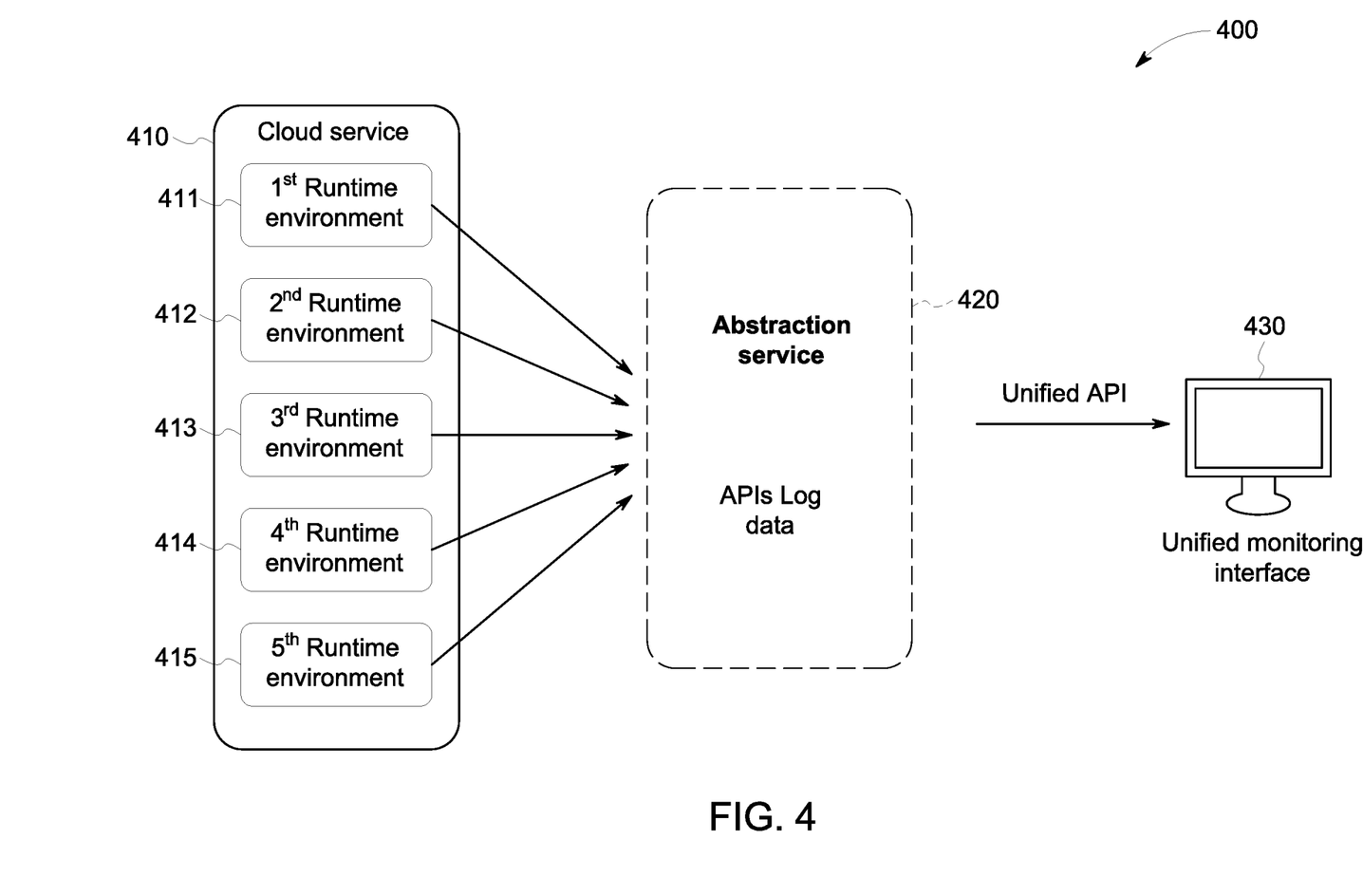
FIG. 4 is a diagram illustrating a service for managing performance monitoring of an application via a unified monitoring interface in accordance with an example embodiment.

FIG. 4 illustrates a service 420 for managing performance monitoring of an application via a unified monitoring interface in accordance with an example embodiment. For example, the service 420 shown in FIG. 4, may be the same service as shown in the examples of FIG. 2 and FIG. 3, or it may be its own distinct service. Referring to FIG. 4, the service 420 may receive performance data from any of the different runtime environments/frameworks 411, 412, 413, 414, and 415, included within cloud services platform 410. For example, the abstraction service 420 may include a plurality of APIs (e.g., RESTful APIs) associated with the plurality of different runtime environments 411-415 for receiving performance monitoring data.

For example, the performance data may be received based upon a request or the service may extract the performance data from various logs included within the runtime. Examples of the log data include application logs, transaction logs, error logs, network logs, event logs, security logs, and the like. The log data may provide information about processing, security, events, dependencies, transactions, errors, data storage, and the like, associated with the application within the runtime environment. In some embodiments, monitoring details may also include a status of resource manager, scheduler, etc., a job status report, resource allocations, usage, etc., driver information, history server information, or the like, based on the job status.

After receiving the performance data, the abstraction service 420 may modify the data into a common format capable of being transmitted via a unified API to a unified monitoring interface 430. Here, the service 420 may generate visualizations, metrics, and the like associated with the performance of an application and output the generated data for display via the unified monitoring interface 430. In this example, it does not matter which runtime environment among the different runtime environments 411-415 includes the application and provides the performance data because the data is output to a common unified monitoring interface 430 based on the abstraction service 420.

Figure 5:
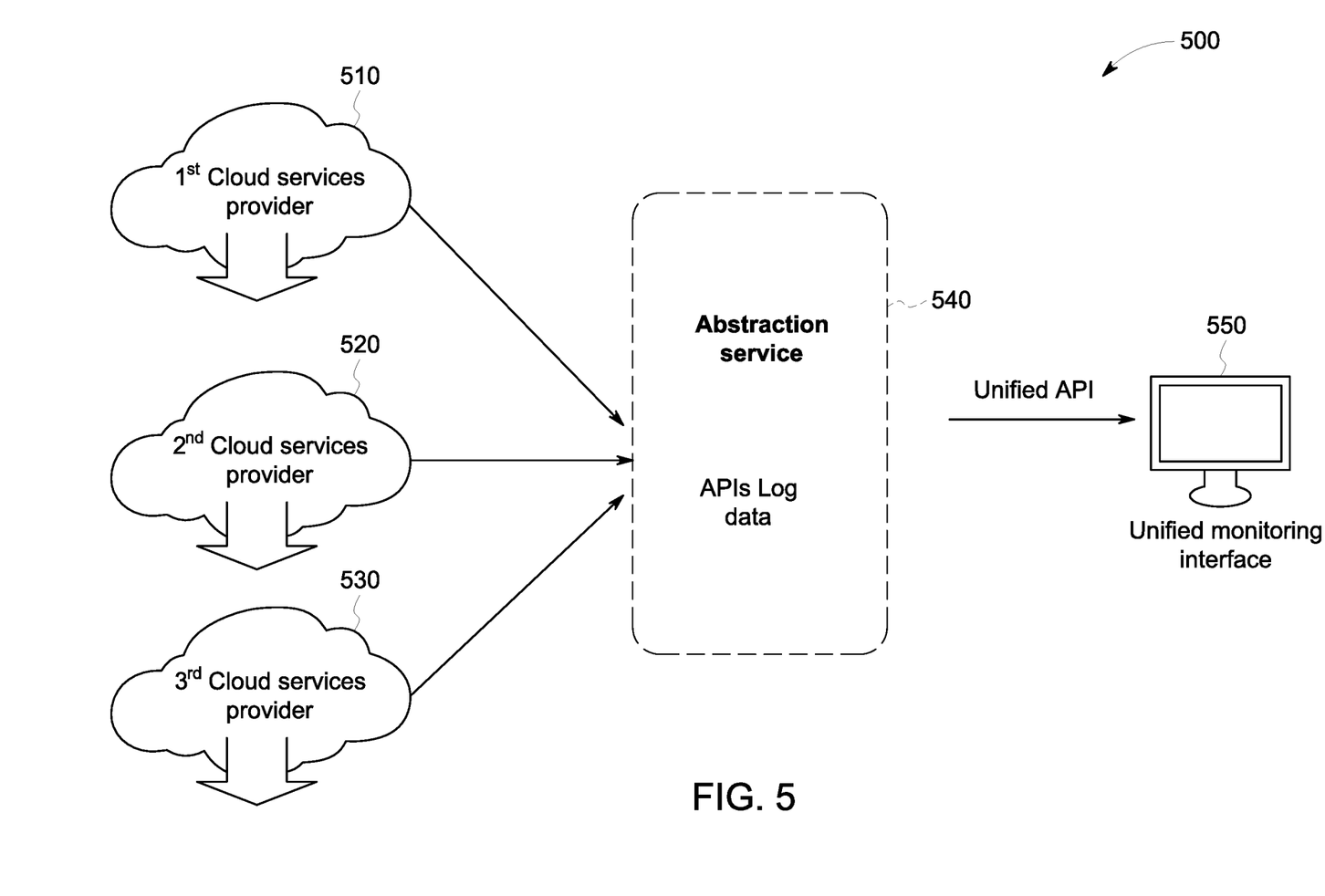
FIG. 5 is a diagram illustrating a service for managing performance monitoring of an application via a unified monitoring interface in accordance with another example embodiment.

FIG. 5 illustrates a service 540 for managing performance monitoring via a unified interface 550 in accordance with another example embodiment. Similar to the example shown in FIG. 4, the service 540 can provide a unified monitoring interface for different cloud service providers 510, 520, and 530, which can host an application and provide performance monitoring information. In this example, the granularity of the interface is expanded to unify not only different runtime environments/frameworks within a cloud services platform, but also to unify different cloud services platforms which may include different or similar sets of runtime environments.

Figure 6:
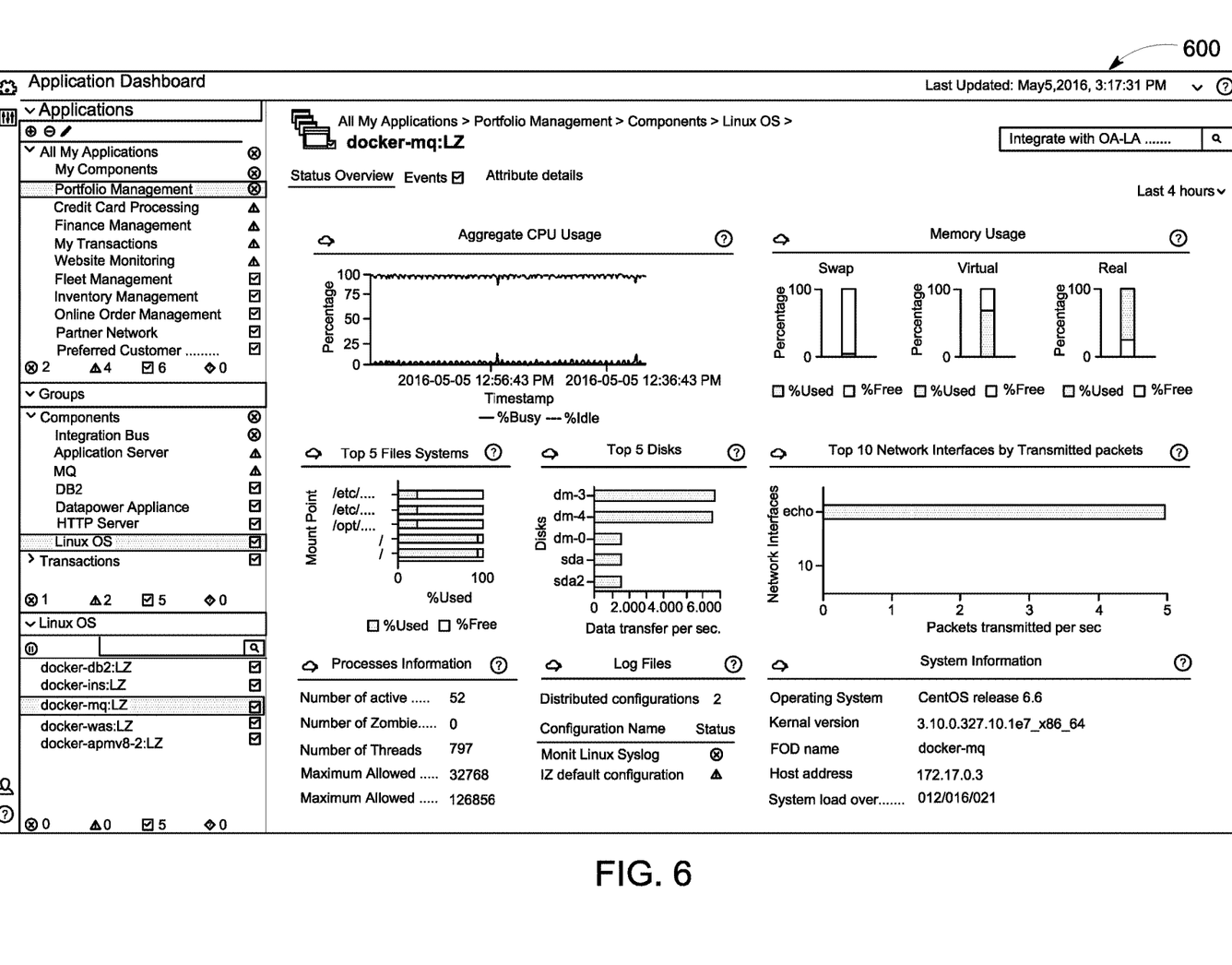
FIG. 6 is a diagram illustrating a unified user interface for application performance monitoring in accordance with an example embodiment.

FIG. 6 illustrates an example of a unified user interface 600 for application performance monitoring in accordance with an example embodiment. It should be appreciated that the interface 600 shown in FIG. 6 is merely for purposes of example and is in no way meant to limit the possible designs, outputs, options, navigation, and the like, that can be included and/or associated with the unified monitoring interface 600. For example, the unified monitoring interface 600 may include a common navigation panel and/or commands for monitoring application performance data regardless of the underlying cloud services platform and/or runtime environment, framework, etc., where the application is deployed and executing. Furthermore, the unified monitoring interface 600 may be used to track and monitor aspects of the application performance during execution and may include a common display/view across different cloud services platforms and runtime environments. Examples of attributes of performance that can be monitored included, but are not limited to, throughput, latency, errors, transactions, processing information, storage information, network information, messaging information, and the like.

Within the unified monitoring interface 600 may be visual representations of data that is being processed by the application as well as visual representations to help understand how the application is performing with respect to the various performance attributes. The visual representations may include graphs, charts, dials, warning notifications, tabular data in rows and columns, colors, shading, and the like. The unified monitoring interface 600 may be output from the host platform (e.g., host platform 120 shown in FIG. 1), and displayed via a user device such as a screen of developer system 130 shown in FIG. 1, however embodiments are not limited thereto.

Figure 7:
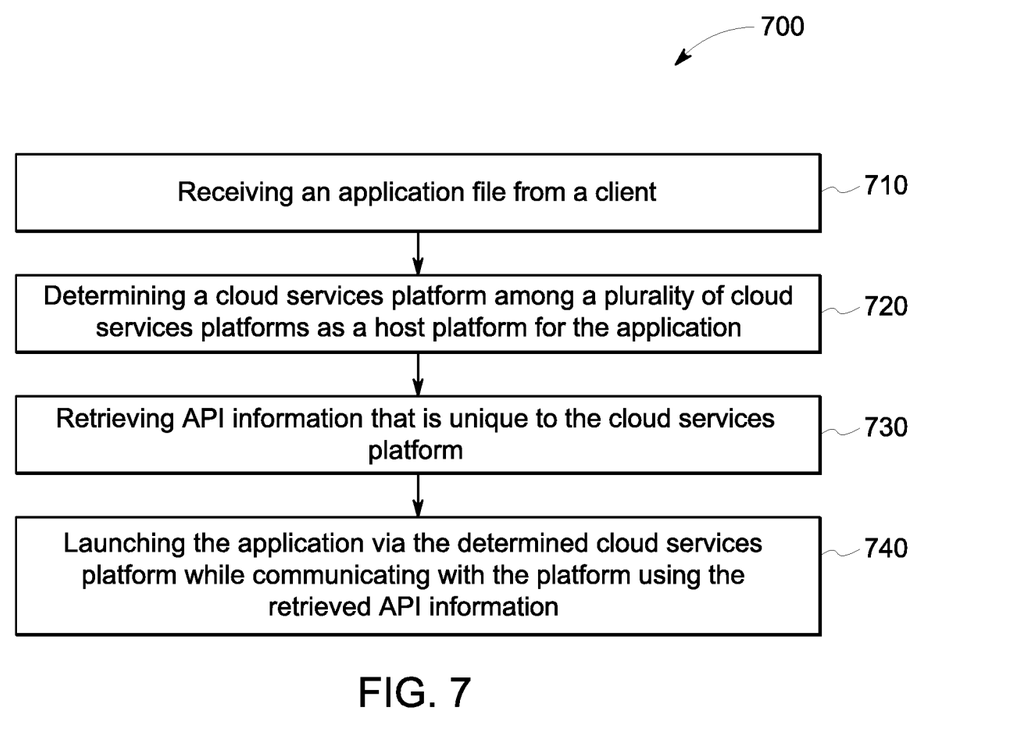
FIG. 7 is a diagram illustrating a method of launching an application in a host environment including multiple execution engines in accordance with an example embodiment.

FIG. 7 illustrates a method 700 of launching an application in a host environment including multiple execution engines in accordance with an example embodiment. For example, the method 700 may be performed by one or more computing system including a web server, a cloud platform, an industrial server, an edge server, a computing device (e.g., desktop, mobile device, appliance, etc.), a database, and the like. Referring to FIG. 7, in 710 the method includes receiving an application from a client. In this example, the application may be an executable file received by the abstraction service described herein and the client may be a developer or other client system attempting to deploy the application for live interaction via a host platform. The executable file may be a host platform agnostic file such as an executable that does not have methods therein for communicating with, security, storage, and the like, with respect to a host platform. For example, the application file may be a cloud services agnostic file that does not include API information for communicating with any of the different cloud services platforms.

In 720, the method includes determining a cloud services platform, from among a plurality of different cloud services platforms, to be a host platform for the application. For example, the service performing the method 700 may have access to multiple different cloud service providers or it simply may be configured for use with multiple different cloud service providers but not presently have access to more than one cloud service provider. In some embodiments, the determining may further include determining a runtime environment and/or framework from among a plurality of different runtime environments and/or frameworks of the determined cloud services platform for executing the application. In some embodiments, the determining may include automatically determining a runtime environment from among a plurality of different runtime environments of the determined cloud services platform for executing the application, for example, based on a type of job to be performed by the application, a type of data to be processed by the application, a state of the host platform, and the like.

In 730, the method includes retrieving API information from storage that is unique to the determined cloud services platform and which is to be used for communicating with the determined cloud services platform when executing the application. For example, the API information may include specific and unique APIs used by the determined cloud services platform which are not used by the other cloud services platforms. For example, the retrieved API information may include one or more APIs used for accessing one or more respective services of the determined cloud services platform. In some embodiments, the retrieving may further include or may instead include retrieving API information of a determined runtime environment and/or framework which is to be used for communicating with the determined runtime environment when executing the application on the determined cloud services platform via the determined runtime environment or framework.

In 740, the method includes launching the application via the determined cloud services platform while communicating with the determined cloud services platform on behalf of the executing application based on the retrieved API information. For example, the service may encapsulate the executing application and perform communication between the application and the cloud services platform. For example, the service may receive data from the application and transmit the data to an API of the cloud services platform, and vice versa. The service may be an abstraction service that is configured to communicate with APIs of respective services on each of the plurality of different cloud services platforms.

The abstraction service may store API information, security information, data storage information, certification information, and the like of the different cloud services platforms (and runtime environments, frameworks, etc.) and retrieve the information for the determined cloud services platform at runtime of the application. The launching may include initiating a start of the execution of the application on the cloud services platform. In some embodiments, the retrieving further includes retrieving one or more of security information, certification information, storage information, and the like, for the determined cloud services platform, and the launching further includes communicating with the determined cloud services platform on behalf of the executing application based on the additionally retrieved information.

Figure 8:
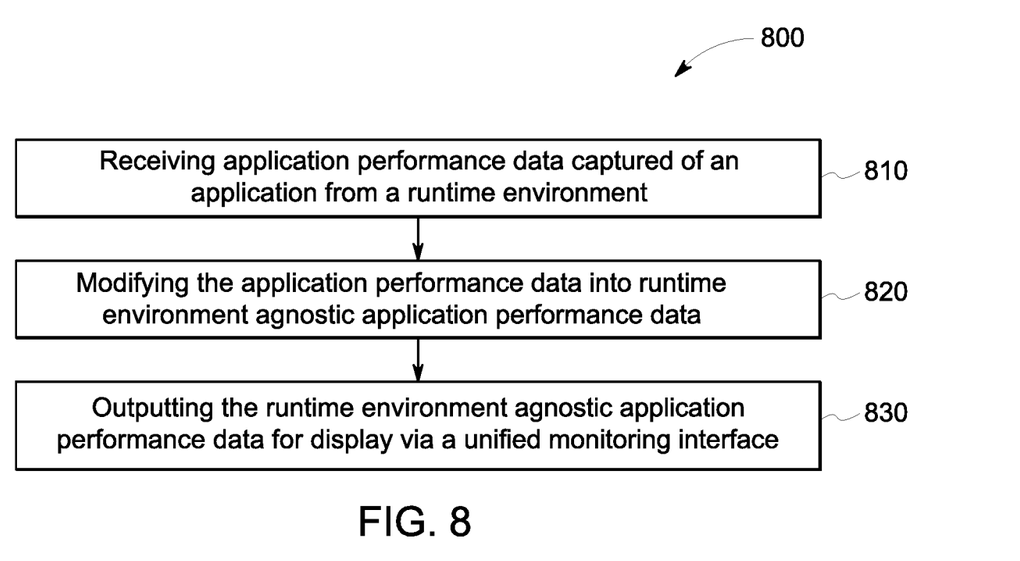
FIG. 8 is a diagram illustrating a method of modifying application performance data for display via a unified monitoring interface in accordance with an example embodiment.

FIG. 8 illustrates a method 800 of modifying application performance data for display via a unified monitoring interface in accordance with an example embodiment. For example, the method 800 may be performed by one or more computing system including a web server, a cloud platform, an industrial server, an edge server, a computing device (e.g., desktop, mobile device, appliance, etc.), a database, and the like. Referring to FIG. 8, in 810 the method includes receiving application performance data of an application from a runtime environment. For example, the application performance data may be provided to the abstraction service described herein which is executing on a computing system. The application performance data may be provided automatically (e.g., in response to the application being launched) or it may be provided based on a request, or the like. The application performance data may include performance attributes of the application captured while executing the application in the runtime environment. The performance attributes may include throughput, errors, processing speed, latency, storage issues, events, and the like, which are created by the application and stored by the environment.

In some embodiments, the application performance data may be received from a runtime environment via a unique API of the runtime environment. For example, each of the different runtime environments may include its own respective unique interface for outputting application performance data to at least one of the plurality of APIs. In this example, the abstraction service may be configured to interact with multiple different runtime environments via multiple APIs, for example, representational state transfer (RESTful) APIs corresponding to the multiple different runtime environments. In this example, each API may be configured to receive application performance data from one or more of the different runtime environments, respectively. The application performance data may include log data that is captured via the runtime environment. The log data may include data from one or more of any known log files such as an application log file, a system log file, an error log file, a transaction log file, an event log file, and the like.

In 820, the method includes modifying the application performance data into runtime environment agnostic application performance data. For example, the modifying may convert the runtime-specific performance data into runtime-agnostic performance data. For example, the modifying may include extracting performance attributes of the stored application performance data from the log data and generating the runtime environment agnostic application performance data based on the extracted performance attributes.

In 830, the method includes outputting the runtime environment agnostic application performance data for display via a unified monitoring interface that is configured to display application performance data of different runtime environments. For example, the outputting may include outputting the runtime environment agnostic application performance data via a unified application programming interface (API) that commonly outputs application performance data from a plurality of different runtime environments. The unified monitoring interface may generate graphs, charts, simulations, virtual twins, and the like, based on data received from the application executing in the host runtime environment. Furthermore, rather than each runtime environment have its own interface (and display data differently) the example embodiments provide the unified monitoring interface which commonly displays the performance data the same regardless of the underlying runtime environment. Here, the abstraction service provides a way of unifying performance monitoring data from the different runtime environments.

Figure 9:
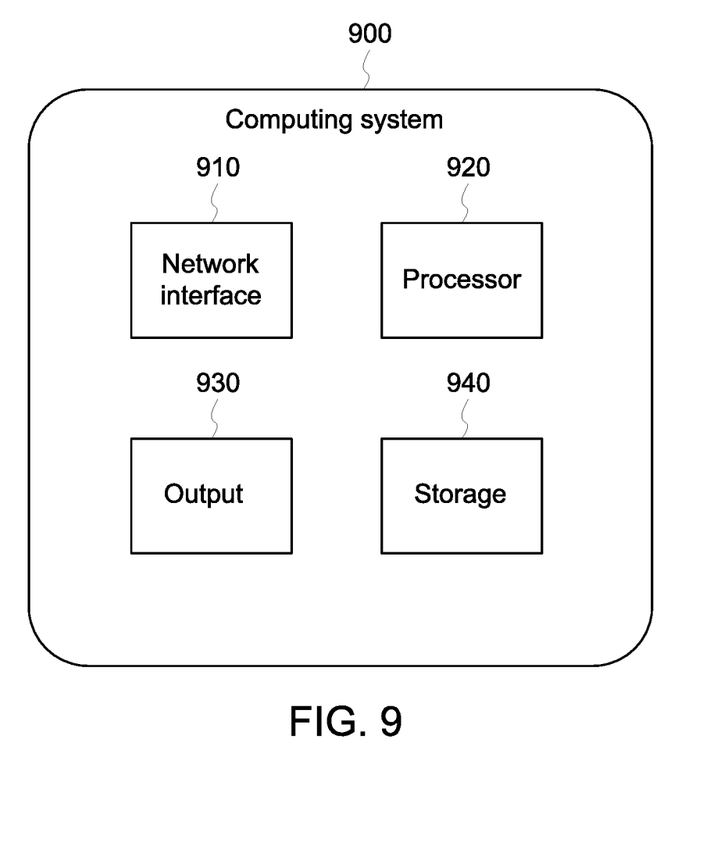
FIG. 9 is a diagram illustrating a computing system in accordance with an example embodiment.

FIG. 9 illustrates a computing system 900 in accordance with an example embodiment. For example, the computing system 900 may be a database, an instance of a cloud platform, a streaming platform, and the like. In some embodiments, the computing system 900 may be distributed across multiple devices. Also, the computing system 900 may perform the method 700 of FIG. 7 and/or the method 800 of FIG. 8. Referring to FIG. 9, the computing system 900 includes a network interface 910, a processor 920, an output 930, and a storage device 940 such as a memory. Although not shown in FIG. 9, the computing system 900 may include other components such as a display, one or more input units, a receiver, a transmitter, and the like.

The network interface 910 may transmit and receive data over a network such as the Internet, a private network, a public network, and the like. The network interface 910 may be a wireless interface, a wired interface, or a combination thereof. The processor 920 may include one or more processing devices each including one or more processing cores. In some examples, the processor 920 is a multicore processor or a plurality of multicore processors. Also, the processor 920 may be fixed or it may be reconfigurable. The output 930 may output data to an embedded display of the computing system 900, an externally connected display, a display connected to the cloud, another device, and the like. The output 930 may include a device such as a port, an interface, or the like, which is controlled by the processor 920. In some examples, the output 930 may be replaced by the processor 920. The storage device 940 is not limited to a particular storage device and may include any known memory device such as RAM, ROM, hard disk, and the like, and may or may not be included within the cloud environment. The storage device 940 may store software modules or other instructions which can be executed by the processor 920.

According to various embodiments, the network interface 910 may receive an application from a client. For example, the application may include a cloud services agnostic executable file that does not include API information for communicating with any of the different cloud services platforms. The processor 920 may determine a cloud services platform, from among a plurality of different cloud services platforms, to be a host platform for the application. For example, the cloud services platform may be selected from among a one or more cloud service platforms that are available at the time. The processor 920 may retrieve API information from storage device 940. The API information may be unique to the determined cloud services platform and may be used for communicating with and accessing the determined cloud services platform when executing the application. Furthermore, the processor 920 may launch the application via the determined cloud services platform and communicate with the determined cloud services platform on behalf of the executing application based on the retrieved API information.

In some embodiments, the processor 920 may further determine a runtime environment from among a plurality of different runtime environments within the determined cloud services platform for executing the application. In this example, the processor 920 may retrieve API information of the determined runtime environment which is to be used for communicating with the determined runtime environment when executing the application on the determined cloud services platform. In some embodiments, the processor 920 may automatically determine a runtime environment from among a plurality of different runtime environments of the determined cloud services platform for executing the application based on a type of job to be performed by the application. Here, the processor 920 may automatically make a decision based on a type of job to be performed by the application (e.g., tasks to be executed), an asset (and asset data) to be operated on by the application, a software programming language of the application, and the like.

In some embodiments, the retrieved API information may include one or more APIs used for accessing one or more respective services of the determined cloud services platform. For example, the retrieving and the launching may be performed by the processor 920 executing an abstraction service that is configured to communicate with APIs of respective services on each of the plurality of different cloud services platforms. In some embodiments, the processor 920 may retrieve other information that is unique to the cloud services platform and which is not included within the application received from the client or developer. For example, the processor 920 may retrieve security information, certification information, processing information, storage information, and the like, for the determined cloud services platform, and communicate with the determined cloud services platform on behalf of the executing application based on the retrieved additional information.

According to various other example embodiments, the computing system 900 may be used for receiving data from different runtime environments and outputting the data via common unified monitoring interface. In this example, the processor 920 may receive application performance data of an application from a runtime environment in which the application is operating. Here, the application performance data may include performance attributes of the application that are captured while executing the application in the runtime environment. Performance attributes may include log data that identifies one or more of throughput, events, errors, system access requests, message requests, connectivity, security, transactions, and the like.

In response, the processor 920 may modify the application performance data into runtime environment agnostic application performance data. For example, the processor 920 may extract performance attributes of the stored application performance data from the log data and generate the runtime environment agnostic application performance data based on the extracted performance attributes. The output 930 may output the runtime environment agnostic application performance data for display via a unified monitoring interface that is configured to display application performance data of different runtime environments. For example, the output 930 may output the performance monitoring data via a unified API, and the performance monitoring interface may display charts, graphs, visualizations, models, digital twins, and the like, based on the performance data.

According to various aspects, the different runtime environments may each have a distinct interface for communicating performance data. The processor 920 may execute the abstraction service which includes a plurality of APIs with at least one API designated for each of the different runtime environments. Accordingly, the abstraction service may receive data via a plurality of APIs and convert the data via a common unified API of the abstraction service to the unified monitoring interface.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), a random-access memory (RAM) and/or any non-transitory transmitting/receiving medium such as the Internet, cloud storage, the Internet of Things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a network interface configured to receive an application from a client, wherein the application is execution environment agnostic; and
   a processor configured to identify a predictive analytic task to be performed by the application on incoming Internet of Things (IoT) data, dynamically select a runtime environment from among a plurality of available runtime environments of a host platform for the application based on the predictive analytic task to be performed, and retrieve application programming interface (API) information from storage that is unique to the selected runtime environment and which is used for communicating with the host platform when executing the application, in the selected runtime environment,
   wherein the processor is further configured to launch an execution of the application via the dynamically selected runtime environment based on the retrieved API information.

2. The computing system of claim 1, wherein the application received from the client device comprises a cloud services agnostic executable file that does not include API information for communicating with any of the different cloud services platforms.

3. The computing system of claim 1, wherein the processor is further configured to determine a runtime environment from among a plurality of different runtime environments of a cloud services platform for executing the application.

4. The computing system of claim 3, wherein the processor is configured to retrieve API information of the determined runtime environment which is to be used for communicating with the determined runtime environment when executing the application on the determined cloud services platform.

5. The computing system of claim 3, wherein the retrieved API information comprises one or more APIs used for accessing one or more respective services of the determined cloud services platform.

6. The computing system of claim 1, wherein the retrieving and the launching is performed by the processor executing an abstraction service that is configured to communicate with APIs of respective services on each of a plurality of different cloud services platforms.

7. The computing system of claim 1, wherein the processor is further configured to retrieve security information a cloud services platform, and communicate with the services platform on behalf of the executing application based on the retrieved security information.

8. A computer-implemented method comprising:
   receiving an application from a client, wherein the application is execution environment agnostic;
   identifying a predictive analytic task to be performed by the application on incoming Internet of Things (IoT) data,
   dynamically selecting runtime environment from among a plurality of available runtime environment of a host platform for the application based on the predictive analytic task to be performed;
   retrieving application programming interface (API) information from storage that is unique to the selected runtime environment and which is used for communicating with the host platform when executing the application, in the selected runtime environment; and
   launching the application via the dynamically selected runtime environment based on the retrieved API information.

9. The computer-implemented method of claim 8, wherein the received application comprises a cloud services agnostic executable file that does not include API information for communicating with any of the different cloud services platforms.

10. The computer-implemented method of claim 8, wherein the determining further comprises determining a runtime environment from among a plurality of different runtime environments of a cloud services platform for executing the application.

11. The computer-implemented method of claim 10, wherein the retrieving comprises retrieving API information of the determined runtime environment which is to be used for communicating with the determined runtime environment when executing the application on the determined cloud services platform.

12. The computer-implemented method claim 10, wherein the retrieved API information comprises one or more APIs used for accessing one or more respective services of the determined cloud services platform.

13. The computer-implemented method of claim 8, wherein the retrieving and the launching is performed by an abstraction service that is configured to communicate with APIs of respective services on each of a plurality of different cloud services platforms.

14. The computer-implemented method of claim 8, wherein the retrieving further comprises retrieving security information for a cloud services platform, and the launching further comprises communicating with the cloud services platform on behalf of the executing application based on the retrieved security information.

15. A non-transitory computer readable medium comprising program instructions that when executed cause a processor to perform a method comprising:

receiving an application from a client, wherein the application is execution environment agnostic;

identifying a predictive analytic task to be performed by the application on incoming Internet of Things (IoT) data, dynamically selecting a runtime environment from among a plurality of available runtime environment of a host platform for the application based on the predictive analytic task to be performed;

retrieving application programming interface (API) information from storage that is unique to the selected runtime environment and which is used for communicating with the host platform when executing the application, in the selected runtime environment; and launching the application via the dynamically selected runtime environment based on the retrieved API information.

16. The non-transitory computer readable medium of claim 15, wherein the application received from the client device comprises a cloud services agnostic executable file that does not include API information for communicating with any of the different cloud services platforms.

17. The non-transitory computer readable medium of claim 15, wherein the determining further comprises determining a runtime environment from among a plurality of different runtime environments of a cloud services platform for executing the application.

18. The non-transitory computer readable medium of claim 17, wherein the retrieved API information comprises one or more APIs used for accessing one or more respective services of the determined cloud services platform.

* * * * *